INVENTORS
ALVIN A. NESSAMAR
GEORGE F. PALUMBO

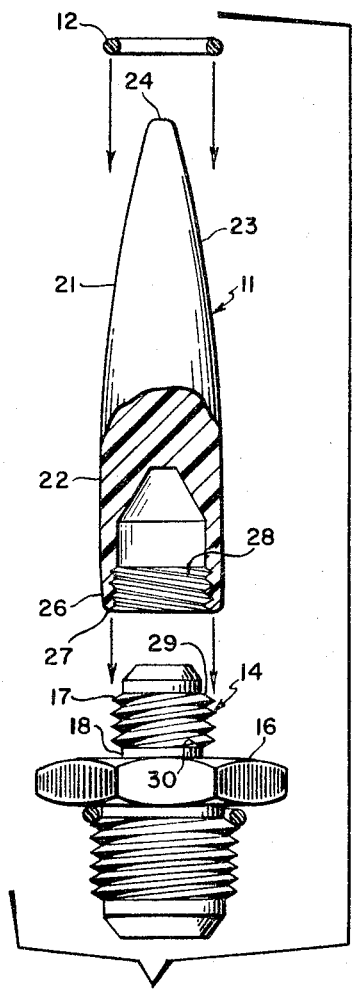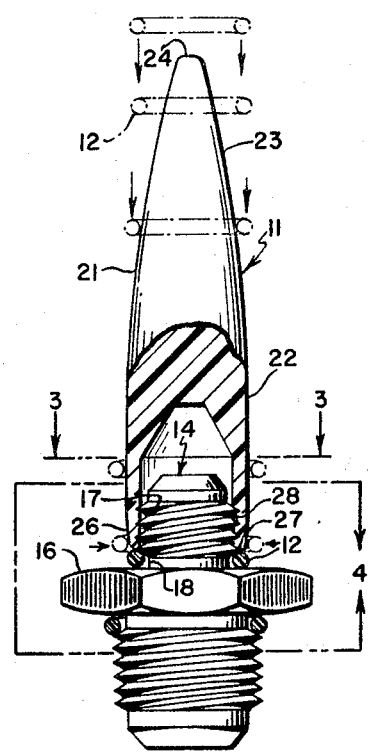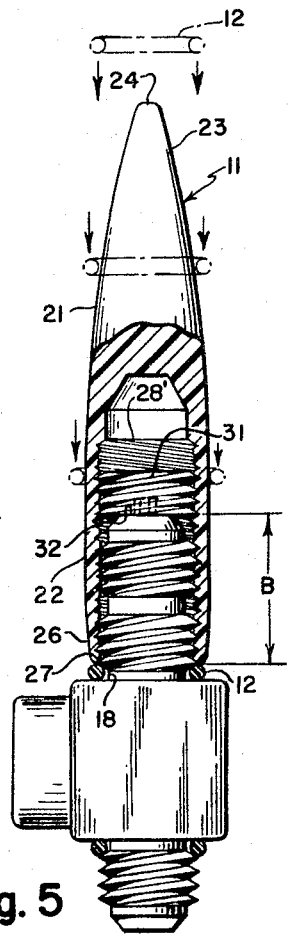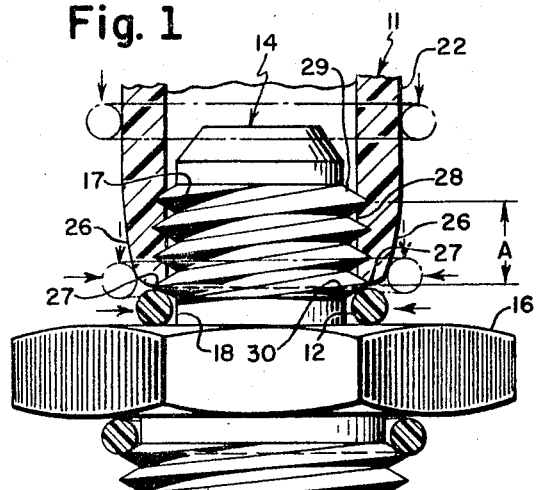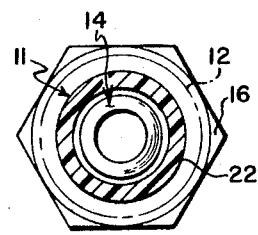
Fig. 1
Fig. 2
Fig. 5
Fig. 3
Fig. 4
INVENTORS
ALVIN A. NESSAMAR
GEORGE F. PALUMBO
BY John Cyril Malloy
ATTORNEY May 16, 1967　　A. A. NESSAMAR ET AL　　3,319,325
GASKET SEATING ADAPTER AND METHOD OF INSTALLING O-RING GASKETS
Filed Oct. 16, 1964　　2 Sheets-Sheet 2

BY John Cyril Malloy

ATTORNEY

United States Patent Office 3,319,325
Patented May 16, 1967

3,319,325
GASKET SEATING ADAPTER AND METHOD OF
INSTALLING O-RING GASKETS
Alvin A. Nessamar, 399 Barrello Lane, Cocoa Beach, Fla.
32931, and George F. Palumbo, 2001 S. Washington
Ave., Titusville, Fla. 32780
Filed Oct. 16, 1964, Ser. No. 404,289
6 Claims. (Cl. 29—235)

This invention relates to a method and to an adapter for use in seating an O-ring or a gasket in a seat of reduced diameter intermediate a threaded stem and an enlarged portion of a fitting and, more particularly, to an adapter of the type set forth which includes positioning means for the adapter to arrange it on the threaded stem in a position such that a gasket may be passed over the exterior surface of the adapter to the seat with the adapter protectively shielding it from damaging engagement with the threads of the stem.

As is perhaps well known, most fittings are of various sizes which are standard and designated by what are known in the trade as AN numbers and the like.

In the past, considerable difficulty has been encountered in positioning O-rings and gaskets over the threaded stem of the various types of plumbing fittings, such as elbows, T's, couplings and the like, to a seat of reduced diameter adjacent an enlarged portion of the fitting. Resort has been made to forcing the gasket or O-ring over the threads by screwdrivers and other types of tools which has often resulted in a damaged O-ring albeit in the seat. The problem has been particularly acute in the missile industry where various types of coupling devices are utilized and undamaged sealing devices must be positioned in seats of the fitting to insure that the entire apparatus in which the fitting is embodied is not wasted as a result of a leak.

The instant invention provides a gasket seating adapter for fittings to guide a gasket or O-ring over the threads to the seat and includes positioning means or a gauge means carried by the adapter arranged to co-operate with the fitting so that the adapter will protectively cover all of the threads with the end of the adapter being at the seat so that the O-ring or gasket is adapted to be guided directly into the seat without damaging contact with the threads.

It is, accordingly, an object of this invention to provide a gasket seating adapter for plumbing fittings, including a threaded stem and an enlarged portion with an intermediate gasket seat of reduced diameter, to provide a smooth surface for an elastic gasket to be passed to the seat, the said adapter shielding the gasket from the threads and including positioning means to engage the fitting and constraining the adapter to a position on the stem of the fitting such that a gasket passed over the adapter will be guided to a seated position without contacting the threads of the stem.

It is another object of this invention to provide an adapter of the type described which includes adjusting means for the positioning means so that one adapter may be used on a plurality of various size fittings.

It is another object of this invention to provide a locking means for the aforesaid adjusting means of a gasket seating adapter so that the adapter may be set for applying gaskets or O-rings to a plurality of a particular type of fitting.

It is another object of this invention to provide an adapter for guiding O-rings to a seat on a fitting having an enlarged portion and a threaded stem on each side of the seat which includes a wrench type positioning means and pushing element to guide the O-ring over the adapter to the seat and which is particularly useful in overhead installations or installations in confined quarters.

It is also an object of this invention to provide a method of applying an O-ring to a seat on a fitting which is located intermediate at threaded stem and an enlarged portion which includes the steps of jacketing the threads of the stem in a thin walled thimble with a smooth exterior surface tapered at one end such that the threads and not the seat are protectively covered by the thimble and traveling an O-ring axially along the thimble to stretch it circumferentially and to guide it to the seat without damaging contact with the threads of the fitting stem.

It is a general object of this invention to provide an adapter which is relatively inexpensive to manufacture, simple in construction, and adapted for use in seating a gasket or O-ring in a seat of reduced diameter on a fitting having an enlarged portion on one side of the seat and a threaded stem on the other side of the seat.

In accordance with these and other objects which will become apparent hereinafter, the instant invention will now be described with reference to the accompanying drawings.

In the drawings:

FIG. 1 is an exploded view of a gasket seating adapter which is partially broken away to illustrate the construction thereof;

FIG. 2 is a view similar to FIG. 1 and illustrating the method of seating a gasket using the adapter of FIG. 1;

FIG. 3 is a cross-sectional view taken on the plane indicated by and looking in the direction of the arrows 3—3;

FIG. 4 is an enlarged view, partly in cross section, of that portion of FIG. 2 with the arrowed line 4—4 therearound;

FIG 5 is an elevation view, partly broken away, which illustrates an adapter provided with a positioning means and which illustrates the method of seating a gasket on a fitting having a relatively long stem over which the gasket must be passed to the seat;

Figure 10:
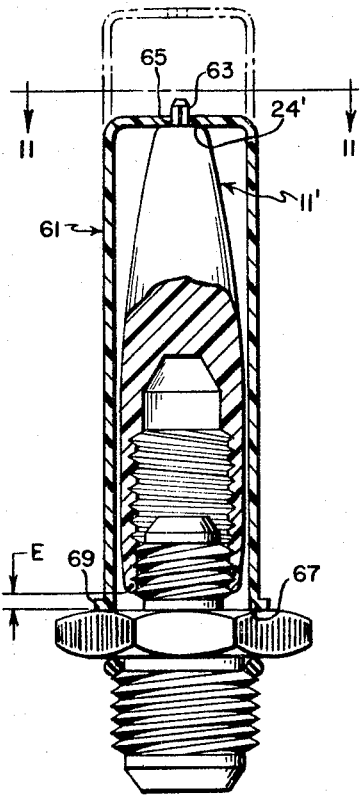
FIG. 10 is an elevation view partly in cross section and partly broken away illustrating an adapter for use in positioning gaskets in the seat of a plumbing fixture having a threaded stem.

Referring to the drawings in detail, the gasket to be seated is designated by the numeral 12; and the numeral 11 designates the thimble of the adapter, with the exception that in FIG. 10 it has been designated by the numeral 11′. Also, throughout the drawings, a fitting of the type on which a gasket is to be seated using the adapter is designated by the numeral 14. Although there are various types of fittings on which the adapter is used, such as elbows, nipples, T's, crosses, plugs, unions, reducers and the like, fittings to which the instant invention will be applicable will include an enlarged portion or flange 16 and a threaded stem of reduced diameter relative to that of the flange with a seat 18 of reduced diameter relative to that of the stem for seating a gasket between the enlarged portion and the stem.

Referring to FIG. 1, it is seen that the adapter is symmetrical about its longitudinal axis and is generally bullet-shaped having a smooth exterior surface 21 with a lower body portion 22 of uniform diameter and an upper elongate tapered end portion 23, the smooth exterior surface of which merges toward and blends in a smooth curve to the surface of the body portion from a preferably flat end 24. The lower end of the body portion is provided with a gradual and relatively short taper 26 to a corner radius of relatively short radius of curvature at the end 27. A bore 28 is provided in the adapter to receive the stem of a fitting in male and female relation. In the embodiment of FIGS. 1–4, the bore 28 is tapped to provide internal mating threads from the end 27 interiorly to a depth which is coincident with the threaded length of the stem 17 of the fitting 14 so that the adapter may be screwed onto the stem and when tightened the major diameter of the leading thread 29 on the stem 17 will be in the bore to a depth from the end 27 which is indicated by the letter A in FIG. 4 whereby by passing a gasket over the adapter as indicated in FIG. 2, the tapered end will circumferentially stretch it uniformly and on passage over the body portion be guided to the seat passing the short taper and radius of curvature at the end 27 for initial relaxation and ultimate captivation in a relaxed state in the seat between the trailing thread 30 of the stem and the flange 16. The material of the gasket may be of rubber, neoprene or other elastic or resilient material such that it recovers from the stretching when in the seat. It is seen that in this embodiment, the distance A in FIG. 4 is determined by the depth of the threads in the bore from the end 27 which is the same as the threaded length of the fitting, the bore being suitably sized to house the projecting distal end of the stem.

Figure 6:
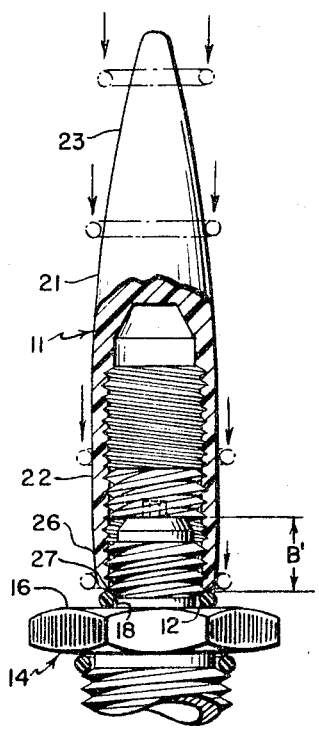
FIG. 6 is an elevation view similar to that of FIG. 5 illustrating the adapter of FIG. 5 arranged on a fitting stem which is of reduced length relative to that of the fitting shown in FIG. 5.
Figure 7:
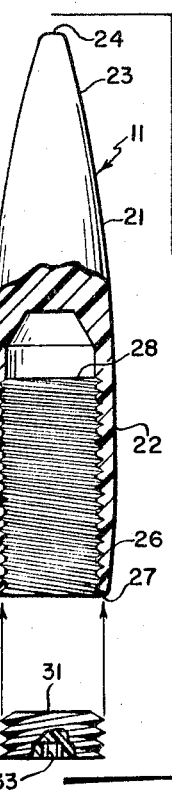
FIG. 7 is an exploded view which is partly broken away of the adapter of FIGS. 5 and 6.
Figure 11:
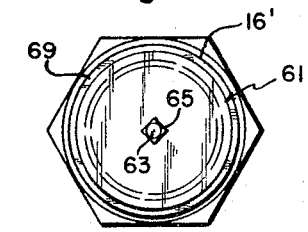
FIG. 11 is a plan view of FIG. 10.

With reference to FIGS. 5–7, it will be seen that the bore 28' extends relatively deep into the thimble and is threaded to a greater depth than the bore 28 of FIG. 1 so as to be of a sufficient threaded length to accommodate various standard length threaded fitting stems; however, because the adapter of FIG. 5 is also to be positioned relative to the fitting such that the end 27 is at a predetermined position with respect to the thread side of the seat 18, an exteriorly threaded insert plug 31 is provided, which by means of a kerf 33 or other suitable tool notch, is adapted to be threadably traveled within the bore 28 to a depth such that the distal end 32 of the fitting will bump against the plug and prohibit movement of the adapter end 27 beyond the position shown in FIG. 5 such that the distance between the plug 31 and the end 27 is as shown. As can be seen in FIG. 6, when the adapter is used on a fitting having a threaded length stem similar to that of FIG. 1, or, otherwise stated, generally shorter than that of the stem of FIG. 5, the insert plug 31 may be traveled to the position such that the distance indicated in FIG. 6 as B' is as shown between the end 27 and the outer surface of the plug 31. Thus, it is seen that the embodiment of FIGS. 5–7 provides, in addition to a thimble for stretching an O-ring or gasket circumferentially and guiding it to a seat 18 on the fitting, also includes an adjustable positioning means to accommodate the various lengths of the standard fittings commonly encountered.

Figure 8:
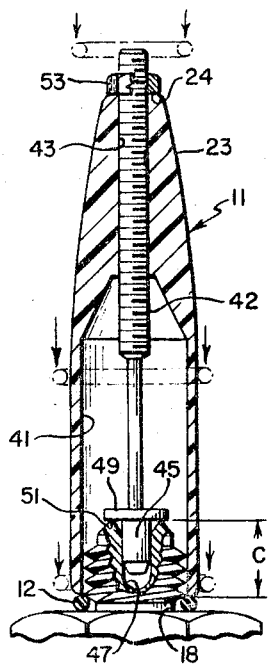
FIG. 8 is a cross-sectional view of a modified adapter for use in positioning gaskets in the seat of a plumbing fixture having a threaded stem.

With reference to FIG. 8, an alternative type of positioning means for the thimble is shown. The thimble is provided with an axial bore 41 in one end having a diameter such that it may be snugly passed over the threads of the stem and is of a depth to accommodate the range of lengths of the various standard stems which are commonly encountered in the art. The preferably flat end 24 of the tapered end portion is provided with a threaded through-bore 43 communicating with the stem-receiving chamber defined by the bore 41 and a threaded stud 42 is threadably movable within the bore 43 and includes a centering pin or pilot 45 on the end in the bore which is adapted to be received in the inside diameter of the passageway 47 of the fitting stem and, further, includes a flange 49 adjacent the pilot to rest on the lip 51 of the stem end, the said flange being in a plane transverse to the longitudinal centerline of the stud. In operation, the adapter is positioned on a stem of a fitting and the stud is threadably traveled so that the pilot and flange are in the position shown in FIG. 8 such with the distance C between the lip 51 of the stem and the open end of the thimble being as indicated. Once the adapter has been positioned thusly by sight, the lock nut 53 may be tightened against the end 24 in the position shown in FIG. 8 so that the adapter may be used for applying an O-ring to a plurality of fittings with a similar length threaded stem.

Figure 9:
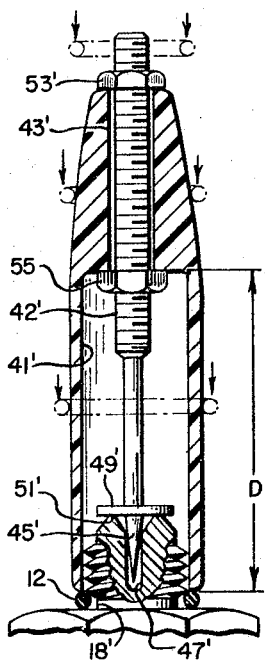
FIG. 9 is a cross-sectional view of another modified adapter for use in positioning gaskets in the seat of a plumbing fixture having a threaded stem.

The modification of FIG. 9 is somewhat similar to that of FIG. 8 in that a through-bore 43' is provided in communication with the chamber 41' and a threaded stud 42' is adapted to be traveled within the bore 43 and includes a pilot 45' and flange 49' in the chamber of the bore 41'. As in the embodiment of FIG. 8, the flange is adapted to rest on the lip 51' at the distal end of the fitting stem. In operation, the nut 55 is adjusted to a suitable position on the threaded length of the stud and the adapter passed over the stud to the position shown in FIG. 9 and locked into position by means of the lock nut or jam nut 53'. The nut 55 may be suitably fastened on the floor of the bore 41' for threaded manipulation of the pilot and flange 49'. Thus, it is seen that when the floor of the bore 41' is at the location shown such that the distance D is adjusted relative to the open end of the bore 41', an O-ring may be passed over the exterior surface of the thimble and directly into the seat 18 as is indicated.

In the embodiment of FIG. 10, the adapter 11' includes a cup 61 which is positioned over it with a driving connection between the thimble and the cup being provided by means of a hex pin 63 on the end 24 of the thimble 11' in a hole 65 in the bottom of the cup. The side walls of the cup 61 are of a length so proportioned with respect to the axial length of the thimble and the stem side surface 67 of the flange that, when the adapter is screwed onto the stem as indicated in FIG. 10, the lip 69 of the cup will act as a gauge by bumping against the surface 67 of the flange. In applying a gasket using the embodiment of FIG. 10, the thimble is separately screwed down to the approximate position shown in FIG. 10, whereupon the cup is positioned as shown with the pin 63 in driving engagement with the sides of the hole 65 so that the cup may be rotated until the lip 69 is in abutting engagement with the flange 67 and the open end of the thimble is in the position shown to define the distance E. Thereafter, the cup is removed and an O-ring passed along the exterior surface of the thimble. It will be seen that the cup may be used to push the O-ring along the guiding surfaces of the thimble to the seat and that the enlarged lip 69 will act and assist in this pushing operation.

While the instant invention has been shown and described herein in most practical and preferred embodiments, it is recognized that departures may be made therefrom within the scope of the invention, which is, therefore, not to be limited to the details disclosed herein but is to be awarded the full scope of the claims so as to embrace any and all equivalent apparatus and methods.

What is claimed is:

1. A gasket-seating adapter for use in combination with a resilient O-ring type gasket and a standard-threaded stem having an annular gasket seat at the base of the threads of said stem, said adapter comprising an elongated one-piece thimble having a substantially continuous smooth outer surface symmetrical about the longitudinal axis of said thimble, the outer surface of said thimble, from end-to-end, having a circular, transverse cross-section and being of a reduced diameter at one end for receiving a resilient O-ring gasket thereon, the other end of said thimble outer surface being of a diameter slightly exceeding the major diameter of a standard thread, said thimble outer surface including a longitudinal, intermediate taper diverging uniformly from said reduced diameter for progressively stretching the resilient O-ring gasket as it is urged axially thereover, said thimble having an axial bore opening immediately into said other end and defining a thin-walled, continuous annulus, symmetrical about said longitudinal axis, said thimble including abutment means in said axial bore and spaced inwardly from said other end for automatically orienting the terminal edge of said thimble in close proximity to the annular seat of the standard-threaded stem when said abutment means engages the therminal end of the stem and all of the threads of the stem are completely jacketed within said thin-walled annulus whereby a resilient O-ring type gasket can be urged axially along said thimble outer surface from one end to the other and is progressively, uniformly circumferentially stretched over the threads of a stem and is deposited in a stretched condition into said annular seat of said stem, said thimble including a relieved outer circumferential edge portion at the terminal end of said other end of said thimble for relaxing said gasket into said annular seat.

2. The method of manually installing a resilient O-ring gasket in an undamaged condition over a standard threaded stem of a fitting having an annular seat of reduced diameter immediately at the base of the threads, comprising the steps of:

telescoping a rigid one-piece tapered, continuous smooth-surfaced thimble having an internal abutment in jacketing relationship completely over the standard threads of a stem and leaving only the annular seat exposed at the immediate end of said thimble by abutingly engaging the terminal end of the threaded stem with the internal abutment; manually urging a resilient annular gasket axially along said smooth-surfaced thimble toward said threads which are jacketed without ever engaging said threads and progressively, uniformly and circumferentially stretching said gasket and maintaining it stretched until the gasket has traversed the jacketed threads while maintaining the gasket in a stretched condition only slightly exceeding the maximum diameter of the standard threads; and manually dislodging said gasket off the end of the thimble jacketing said threads and immediately in stretched relation into said annular seat without any scuffing or chaffing of said gasket whereby said gasket is maintained substantially in its original manufactured condition and functions in the manner for which it was designed.

3. A gasket-seating adapter for a fitting including a threaded stem with an enlarged portion and a gasket seat intermediate the threaded stem and the enlarged portion comprising; a thin walled thimble of circular cross-section having an axial bore at one end to a depth and of a diameter to snugly jacket the threads of the stem and a smooth exterior surface to provide guide means for the gasket, the cross-sectional area of the exterior surface being of reduced size at the other end for ready insertion into the eye of the gasket and being of a progressively increasing diameter to progressively stretch a gasket being urged over the thimble to the said one end, positioning means carried by the thimble to engage the fitting and to constrain the thimble to a position on the stem such that the said one end is in the same plane as the major diameter of the thread closest to the seat to protectively cover it, whereby the gasket can be urged over the exterior surface to the seat without contacting said threaded stem, said bore being threaded to an axial depth from said one end sufficient to receive various lengths of threaded stems, said positioning means including a threaded plug axially movable in the bore to a position such that the distance between the exterior surface of the plug and the said one end is sufficient to protectively cover all of the threads.

4. A gasket seating adapter as set forth in claim 3 wherein the plug is provided with a kerf to receive a tool to travel it in the bore.

5. A gasket-seating adapter for use in combination with a resilient O-ring gasket and a standard-threaded stem having an annular seat at the base of the threads of said stem, said adapter having a substantially continuous smooth outer surface symmetrical about the longitudinal axis of said thimble, the outer surface of said thimble, from end-to-end, having a circular, transverse cross-section and being of a reduced diameter at one end for receiving a resilient O-ring gasket thereon, the other end of said thimble outer surface being of a diameter slightly exceeding the major diameter of a standard thread, said thimble outer surface including a longitudinal, intermediate taper diverging uniformly from said reduced diameter for progressively stretching the resilient O-ring gasket as it is urged axially thereover, said thimble having an axial bore opening immediately into said other end and defining a thin-walled annulus symmetrical about said longitudinal axis, said thimble including abutment means in said axial bore and spaced inwardly from said other end for automatically orienting the terminal edge of said thimble in close proximity to the annular seat of the standard-threaded stem when said abutment means engages the terminal end of the stem and all of the threads of the stem are completely jacketed within said thin-walled annulus whereby a resilient O-ring type gasket can be urged axially along said thimble outer surface from one end to the other and is progressively, uniformly circumferentially stretched over the threads of a stem and is deposited in a stretched condition into said annular seat of said stem, and a cup telescoped over said thimble and beyond said other end a distance sufficient to enclose said annular gasket-seat when the thimble is positioned on a threaded stem, said thimble and cup including a separable driving connection therebetween.

6. A gasket seating adapter as set forth in claim 5 wherein the distal end of the cup is provided with an enlarged lip for pushing a gasket over the exterior surface of the thimble.

References Cited by the Examiner

UNITED STATES PATENTS

| | | | |
|---|---|---|---|
| 892,287 | 6/1908 | Morse | 29—235 XR |
| 2,334,558 | 11/1943 | Jones | 29—236 |
| 2,344,687 | 3/1944 | Fischer et al. | 29—450 XR |
| 2,764,160 | 9/1956 | Alexander et al. | 29—235 XR |
| 2,807,078 | 9/1957 | Erdmann | 29—229 |
| 3,036,371 | 5/1962 | Gray et al. | 29—235 |
| 3,115,701 | 12/1963 | Jones | 29—229 XR |

WILLIAM FELDMAN, *Primary Examiner.*

J. C. PETERS, *Assistant Examiner.*